S. E. SHAFER.
HAY RACK.
APPLICATION FILED MAY 20, 1908.
1,003,010.
Patented Sept. 12, 1911.
2 SHEETS—SHEET 1.
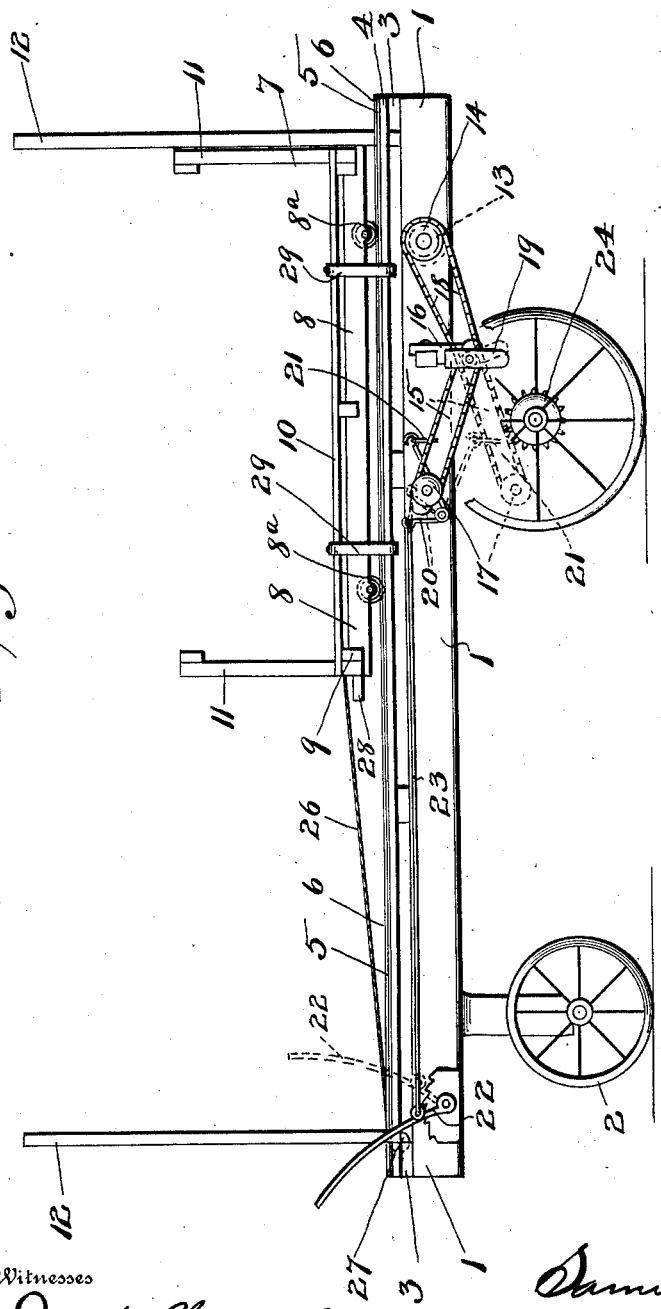
Witnesses
Inventor
Samuel E. Shafer
By D. A. Gourick
Attorney

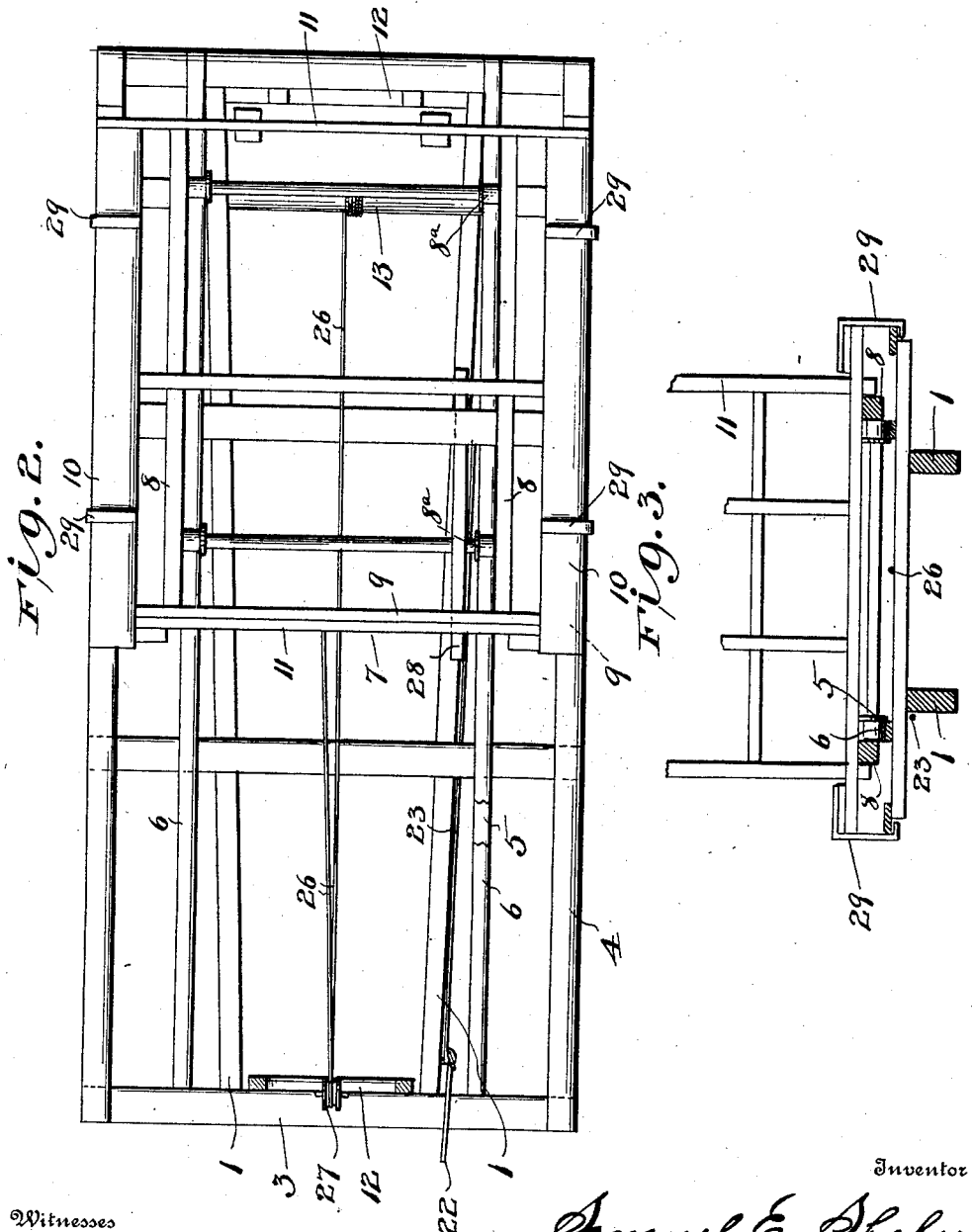

UNITED STATES PATENT OFFICE.

SAMUEL E. SHAFER, OF ELKHART COUNTY, INDIANA.

HAY-RACK.

1,003,010.  Specification of Letters Patent.  Patented Sept. 12, 1911.

Application filed May 20, 1908. Serial No. 433,879.

*To all whom it may concern:*

Be it known that I, SAMUEL E. SHAFER, a citizen of the United States, residing in Elkhart county, in the State of Indiana, have invented certain new and useful Improvements in Hay-Racks, of which the following is a specification.

My invention relates to hay racks for farm wagons and has for its object the improvement of devices of this character by mounting a truck on the rack half the length thereof and arranged to roll from one end of the rack to the other so that half of the load may be placed on the truck while at one end of the rack and then moved to the other end and the loading continued at the same end of the wagon.

My invention also contemplates a construction of gearing for moving the truck that may be thrown into gear with a gear wheel on one of the wheels of the wagon, the lever for actuating the gearing being so positioned that when the truck reaches the limit of its movement in a loaded condition it engages the lever and throws the gearing out of gear with the wagon wheel.

The construction and operation of my improved hay rack will be described hereinafter and illustrated in the accompanying drawings in which—

Figure 1 is a side view of my improved hay rack, Fig. 2, a top plan view, Fig. 3, a cross section of the rack and truck, and Fig. 4, a detail view of the arm carrying the operating gear.

In the drawings similar reference characters indicate corresponding parts throughout the several views.

1 indicates the sills of the hay rack mounted on wheels 2 and having cross-pieces 3 mounted thereon with the side boards 4 secured to the ends of said cross-pieces, and longitudinal strips 5 secured intermediate of the ends of the cross-pieces that act as tracks for the truck to be hereinafter described. The strips 5 are preferably covered with metal bars 6 to protect them from wear.

7 indicates the truck which is substantially one-half the length of the rack, just described, consisting of longitudinal beams 8 having rollers 8ª journaled thereon that ride on the longitudinal strips 5.

9 indicates cross-pieces secured to beams 8, and 10 side-boards secured to the ends of cross-pieces 9.

11 indicates railings secured to the two ends of the truck 7.

12 indicates the ladders at the two ends of rack.

13 indicates a roller journaled on sills 1 near the rear end of the wagon and having a sprocket wheel 14 keyed thereon.

15 indicates an arm pivotally mounted on support 16 secured to sill 1 having an idle wheel 17 journaled on its free end.

18 indicates a chain geared on the sprocket wheel 14 and engaging idler 17.

19 indicates a guide for chain 18 secured to arm 15.

20 indicates a bell-crank lever fulcrumed on sill 1 having one end connected by means of link 21 with arm 15 and its other end connected with lever 22, fulcrumed at the front end of the rack, by means of rod 23.

24 indicates a sprocket wheel secured to one of the wheels 2 that engages chain 18 when the arm 15 is lowered by swinging the lever 22 toward the rear end of the rack.

26 indicates a chain or cable secured to roller 13 and passed around pulley 27 at the front of the rack and having its end secured to the front end of truck 7.

28 indicates a rod secured to the front end of truck 7 that engages lever 22 when the truck reaches the front of the rack and swings it forward so that the arm 15 is raised and the chain 18 thrown out of engagement with sprocket wheel 24.

In operation the truck is over the rear end of the rack when the loading is begun and the truck is first loaded. The arm 15 is then lowered by swinging the lever 22 toward the rear of the rack. By starting the wagon forward the roller 13 is rotated through the sprocket wheels 24 and 14 and chain 18, winding the chain or cable 26 thereon so that the truck 7 with its load is moved to the front end of the rack. As stated above when the truck reaches the front end of the rack the rod 28 engages lever 22 and swings it so that the arm 15 is raised and the roller 13 thrown out of gear with the wheel 2 and the forward motion of the truck 7 automatically stopped.

29 indicates clips secured to the side-boards 10 and engaging the underside of side-boards 4 to prevent the truck from tipping over.

Having thus described my invention what I claim is—

1. In combination with a running gear, a hay rack mounted thereon, a truck mounted on said rack, gearing to move said truck from one end of the rack to the other arranged to be driven by one of the traction wheels, and means actuated by the truck when moved to throw said gearing out of gear with the traction wheel.

2. In combination with a running gear, a hay rack mounted thereon, a truck mounted on said rack, a roller journaled on the rack, a flexible element secured to the roller and to the truck, a sprocket wheel secured to the roller, a chain geared to said sprocket wheel, a sprocket wheel secured to one of the traction wheels, and means manually actuated to throw the chain aforesaid into gear with the sprocket wheel on the traction wheel to move the truck from one end of the rack to the other and actuated by the truck when its movement is completed to throw it out of gear to stop the movement of the truck.

3. In combination with a running gear, a hay rack mounted thereon, a truck mounted on said rack, a roller journaled on the rack, a flexible element secured to the roller and to the truck, a sprocket wheel secured to the roller, an arm pivotally secured to the rack, an idle wheel secured to the arm, a chain geared on the sprocket wheel and engaging the idle wheel, a sprocket wheel secured to one of the traction wheels, and means manually actuated to swing the arm so that the chain is thrown into gear with the sprocket wheel on the traction wheel to move the truck from one end of the rack to the other and actuated by the truck when its movement is completed to throw it out of gear to stop the movement of the truck.

4. In combination with a running gear, a hay rack mounted thereon, a truck mounted on said rack, a roller journaled on the rack, a flexible element secured to the roller and to the truck, a sprocket wheel secured to the roller, an arm pivotally secured to the rack, an idle wheel secured to the arm, a chain geared on the sprocket wheel and engaging the idle wheel, a sprocket wheel secured to one of the traction wheels, an operating lever fulcrumed on the rack, a bell-crank lever fulcrumed on said rack, a link connecting one arm of said lever with the arm carrying chain aforesaid, a rod connecting the other arm of the bell-crank lever and said operating lever, said lever being actuated manually to throw the chain into gear with the sprocket wheel on the traction wheel, and a rod secured to the front end of the truck to engage the lever and move the chain out of gear with the sprocket wheel aforesaid.

5. In a self-loading hay rack the combination with a running-gear, of a rack mounted on said running-gear, said rack being provided with a movable carrier, and means operated by the rotation of a wheel of the running-gear to move the carrier from the rear to the front of the rack, whereby the rack may be loaded at the rear and the load moved from the rear to the front of the rack.

6. In a self-loading hay rack, the combination with a running-gear, of a rack mounted on said running-gear, said rack being provided with a movable carrier, means operated by a wheel of the running-gear for moving the carrier from the rear to the front of the rack, and means under control of the operator for controlling said moving means.

7. The combination with a wagon hay-rack, and a carrier mounted for travel thereon; of means driven by the wheels of the wagon for operating the carrier, and means operating when the carrier arrives at the end of its travel to throw said driving means out of gear.

8. In a self-loading hay rack, the combination with a running-gear, of a rack mounted on said running-gear, said rack being provided with a movable carrier, means operated by a wheel of the running-gear for moving the carrier from the rear to the front of the rack, means under control of the operator for controlling said moving means, and means for automatically stopping the forward movement of the carrier when it has reached a predetermined position.

In testimony whereof I hereto affix my signature in the presence of two witnesses.

SAMUEL E. SHAFER.

Witnesses:
　JACOB R. BRECKERMAN,
　HELEN B. ALBRIGHT.